Dec. 2, 1952 W. A. SLOPER 2,619,891
PRUNING AND CULTIVATING IMPLEMENT
Filed April 29, 1949 3 Sheets-Sheet 1

INVENTOR.
WILLARD A. SLOPER
BY
ATTORNEY

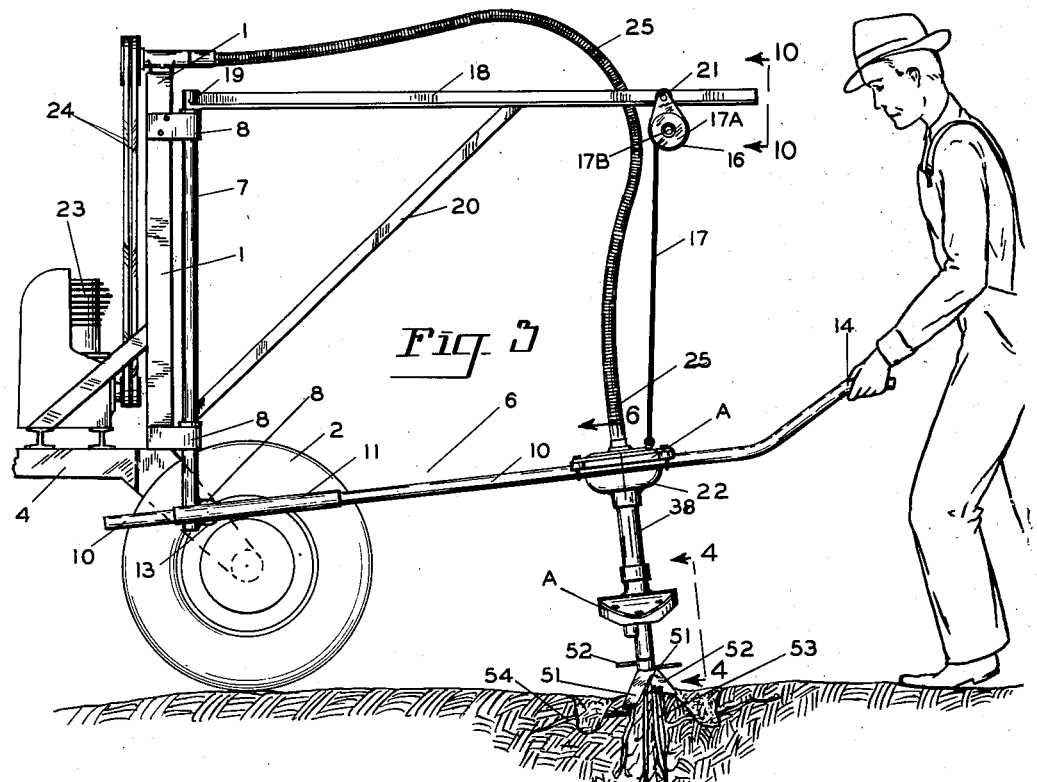

Dec. 2, 1952 — W. A. SLOPER — 2,619,891
PRUNING AND CULTIVATING IMPLEMENT
Filed April 29, 1949 — 3 Sheets-Sheet 3
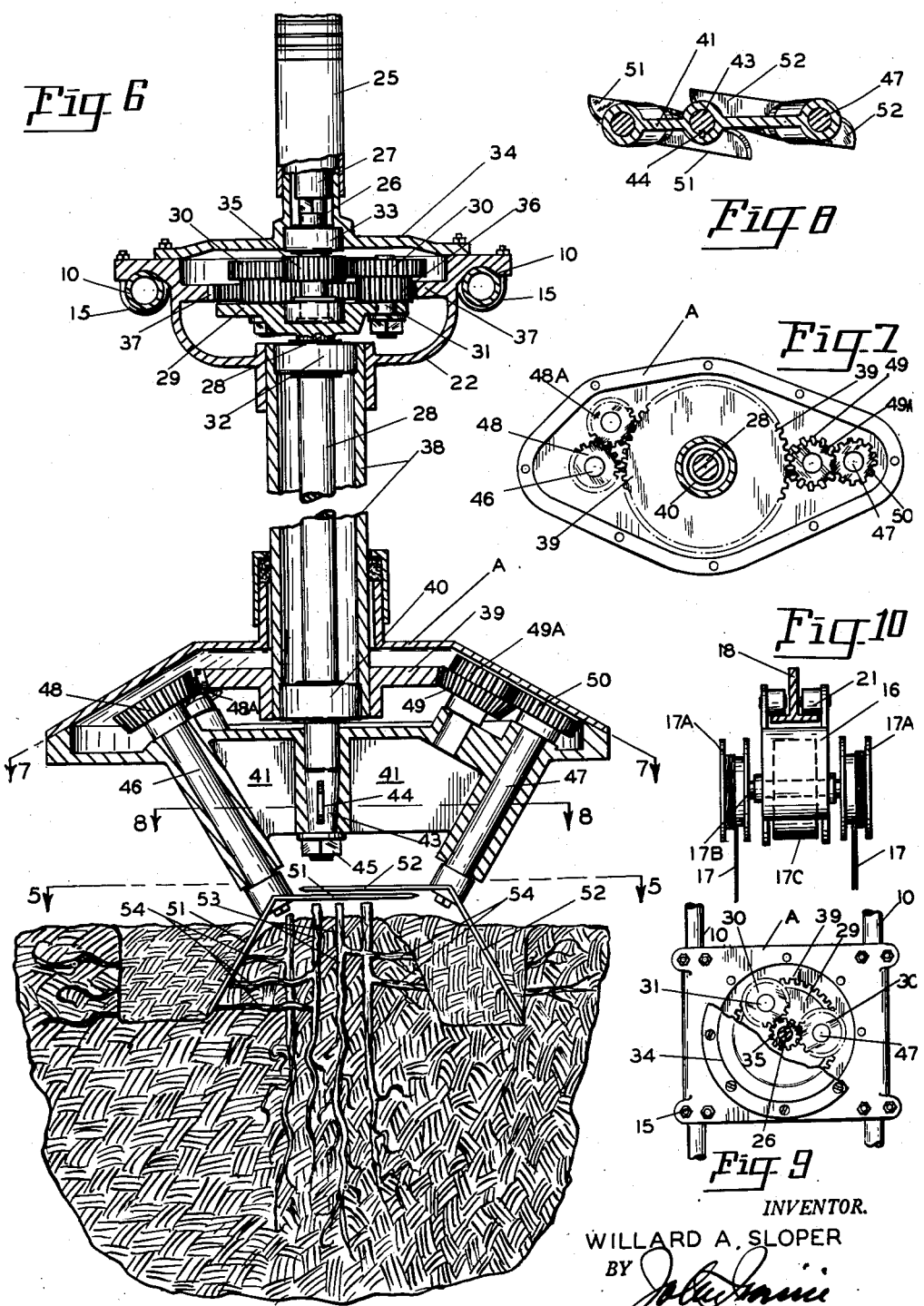
INVENTOR.
WILLARD A. SLOPER
BY
ATTORNEY Patented Dec. 2, 1952

2,619,891

UNITED STATES PATENT OFFICE 2,619,891

PRUNING AND CULTIVATING IMPLEMENT

Willard A. Sloper, Independence, Oreg.

Application April 29, 1949, Serial No. 90,407

5 Claims. (Cl. 97—212)

This invention relates to pruning and cultivating implements and is particularly adapted to be used in connection with pruning and cultivating of hop plants and the like.

The primary object of the invention is to provide a power driven pruning and cultivating unit that can be manually positioned over plants for the purpose of trimming the tops and suckers away from the plant roots by the rotation of pruning and cutting blades over and around the plants.

A further object of this invention is the provision of a pruning and cultivating unit that will mulch the ground around the roots of the plant in its operation.

A still further object of my invention is the mounting of a number of pruning and cultivating units on a special supporting frame wherein the units can be moved relative to the frame in all directions in order to position the units directly above the plants to be pruned and cultivated. The supporting framework, in the carrying out of this object, is either towed behind a tractor, or is mounted thereon. Means is provided within the framework for supporting and counterbalancing the pruning and cultivating units while they are being manipulated relative to the plants being pruned and cultivated.

These and other incidental objects will be apparent in the drawings, specification and claims.

Figure 3 is a side view of the pruning and cultivating implement illustrating one of the pruning and cultivator units having completed the pruning and cultivating of the plant, and being raised therefrom by the operator.

Figure 4 is an enlarged side view of the pruning and cultivating unit, taken on line 4—4 of Figure 3 looking in the direction indicated.

Figure 5 is a plan sectional view taken on line 5—5 of Figure 6 illustrating the path and movement of the pruning and cultivator blades relative to the plant.

Figure 6 is an enlarged sectional view taken on line 6—6 of Figure 3 of the pruning and cultivating unit illustrating the method of mounting and rotating the blades.

Figure 7 is a plan sectional view taken through the pruning and cultivating unit on line 7—7 of Figure 6, illustrating the method of driving the rotating pruning and cultivator blades.

Figure 8 is a plan sectional view taken on line 8—8 of Figure 6, illustrating a lower portion of the unit, consisting of the driving shaft, and the stub shafts used for rotating the blades.

Figure 9 is a plan view of the reduction gear box used for driving the blades. This view is partially in section.

Figure 10 is a side view, taken on line 10—10 of Figure 3, illustrating the construction of the counterbalancing reel for supporting the pruning and cultivator units.

Figure 1:
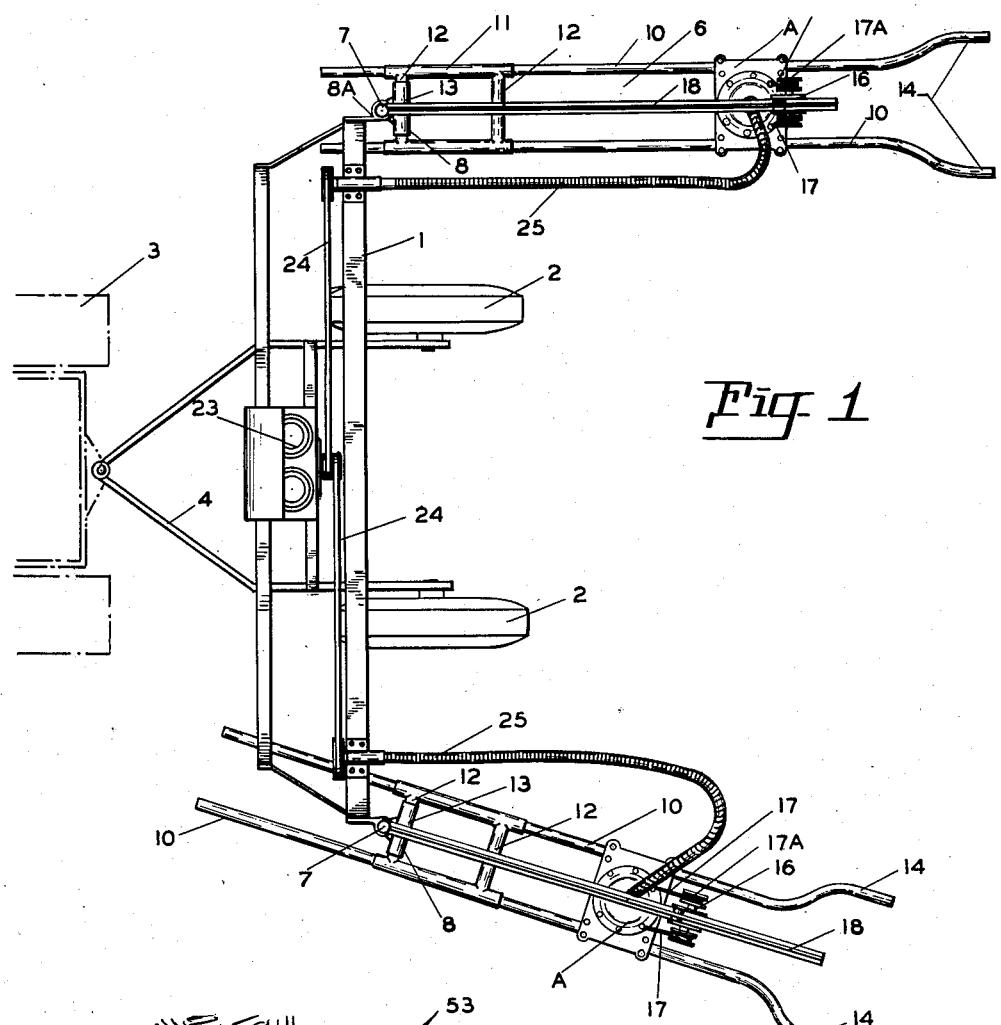
Figure 1 is a plan view of my new and improved pruning and cultivating implement, showing two pruning and cultivator heads mounted thereon.
Figure 2:
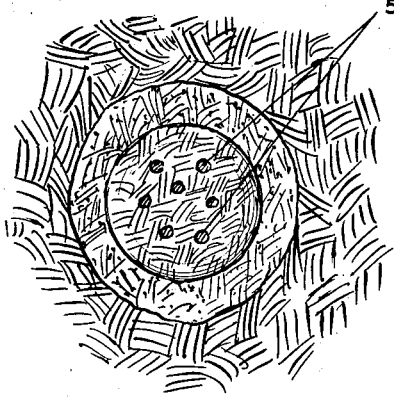
Figure 2 illustrates a plan view of a plant after the same has been pruned and cultivated.

Referring more specifically to the drawings:

My new and improved pruning and cultivating implement consists of a framework 1, mounted upon wheels 2 and adapted to be towed by a tractor 3 by way of the tongue 4. I do not wish to be limited to this particular adaptation of my implement, as the framework may be mounted upon the tractor as well as the method I have disclosed in my drawings.

My invention consists of mounting pruning and cultivating units A to the framework 1 by way of the swingable and counterbalanced frames 6. The frames 6 are pivotally connected to the vertical standards 7 at 8, which in turn are rotatably mounted within the bearings 8A forming part of the framework 1. The frames 6 consist of two parts. The parallel bars 10 and the tubular guide members 11. The tubular guide members 11 are connected together by the cross bars 12, one of the said cross bars 12 is journalled within the tubular bearing 13, the said tubular bearing being fixedly secured to the standards 7.

The longitudinal and parallel bars 10 slide freely through the tubular guides 11 at their one end, and terminate in their opposite ends in handle bars 14, which are adapted to be controlled by the operator.

The pruning and cultivator units A are secured to the bars 10, as best illustrated in Figures 1, 3 and 6 by any suitable means, as for instance the U-bolts 15. The weight of the cultivating unit is supported by the spring wound reel 16 through the cables 17. The reel 16 is supported by the horizontal rail 18, the said rail being fixedly connected to the standard 7 at 19 and braced thereto by the brace 20. The cables 17 are wound on the drums 17A, which are keyed to the shaft 17B. A coil spring 17C winds the shaft and drums against the cable supporting the pruning and cultivating units. The reel 16 moves along the rail 18 by way of the roller hanger 21 when the bars 10 are moved within the guides 11 in the operation of the pruning and cultivating units A, which will be more fully described later on.

I will now describe the pruning and cultivating unit construction. The upper portion of the unit, indicated at 22, houses a gear reduction assembly for reducing the speed of the pruning and cultivating blades in relation to the speed of the motor 23. This gear reduction may be of any suitable design, although I have illustrated a planetary gear reduction assembly.

The pruning and cultivator units receive their driving power from the motor 23 through the belts 24 and flexible drive shaft 25 into the stub shaft 26, which is rotated by the drive shaft 27 of the flexible drive 25. Extending downwardly from the reduction gear assembly is a driven shaft 28, the said shaft has a flanged head 29 at its upper end to which the idler gears 30 are journalled to by way of the spindle bolts 31. The stub shaft 26 is journalled within a bearing 32 located in the flanged head 29 at its lower end and within the bearing 33 located in the cover plate 34 at its upper end.

A relatively small driving pinion 35 is keyed to the stub shaft 26 and meshes with the idler gears 30. The gears 30 have a stepped down gear portion 36, which in turn meshes with the internal ring gear 37. The ring gear 37 forms part of the case of the gear box and remains stationary, therefore as the pinion 35, driven by the flexible shaft 26, drives the gears 30 within the ring gear 37, in turn rotating the flange 29 of the shaft 28, driving said shaft at a reduced speed. I have illustrated this planetary system of reducing the speed of the shaft 28, although I do not wish to be limited to this structure, as the speed of the shaft may be reduced from a transmission located elsewhere, although this system works admirably well with my new and improved pruning and cultivating implement.

My invention really begins with the pruning and cultivating units A, which I will now describe. Extending from the gear reduction head 22 downwardly is a tubular housing 38. This housing does not rotate but supports the units, together with the bevel gear 39. The lower end of the shaft 38 is also journalled within a bearing 40 within the tubular housing 38 and extends downwardly therefrom, terminating in the rotating head 41 by way of the hub 42 to which the tapered end 43 of the shaft is keyed by the key 44 and held in place by the nut 45.

Shafts 46 and 47 are journalled within the head 41, as best illustrated in Figure 6. On the upper end of shaft 46 is keyed a bevel gear 48, the shaft 47 has a spur gear 50 keyed to its upper end. The bevel gear 48 meshes with the idler gear 48A, the said gear 48A meshes directly with the bevel gear 39 above mentioned.

The object of providing the idler gear 48A will be more fully described later on. The shaft 47 is driven from the bevel gear 39 by the bevel gear 49, and forming part of the bevel gear 49 is a spur gear 49A. This spur gear drives the spur gear 50, which is keyed to the shaft 47. The object of providing the idler gears 49 and 49A will be more fully described later. Fixedly secured to the lower end of the shafts 46 and 47 are substantially U-shaped pruning and cultivating blades 51 and 52.

It will be noted that the shafts 46 and 47 are positioned at an angle to the vertical center line of the unit, and that the blades 51 and 52 are set at an angle to the center lines of the said shafts 46 and 47. The blades lie in a horizontal plane when they face one another, and when they leave one another on their rotation they being to assume an angle to the vertical center line of the unit.

I will now describe the operation of my pruning and cultivating implement. The operator grasps the handle bars 14, raises the pruning and cultivating units A clear of the ground surface while the tractor moves the implement forward. When the units A are approximately directly above the plants, indicated by numeral 53, the forward movement of the cultivator is stopped. The operator manipulates the handle bars of the unit either forward or backward until it is directly over the plant with the cultivating blades. He may have to swing the cultivator heads to various positions radially of the standard 7, best illustrated in Figure 1. This can be done by moving the handle bars sidewise in either direction which rotates the standard 7 within its bearings 8, together with the supporting rail 18 and the reel 16.

When he has the unit A directly over the plant he pushes down on the handle bars, and as the motor 23 is revolving the shaft 28 within the cultivating and pruning heads, this shaft will rotate the head 41 carrying the shafts 46 and 47, together with the associated gears 48, 49 and 50 about the stationary gear 39. This will cause the said gears 48, 49 and 50 to rotate due to the fact that the gear 39 is being held stationary by the tube 38. In their rotation they will rotate the blades 51 and 52 as indicated in Figure 5.

Referring to Figures 3 and 6, it will be noted that the pruning blades sever the sucker roots 54 of the plants 53 in the rotation of the blades 51. Referring particularly to Figures 4, 5, 6 and 8, the shaft 47 and the cultivating blade 52 is located a greater distance away from the center line of the unit A than is the shaft 46 and its pruning cutting blade. The object of varying this distance is to provide for a wider swath of cultivation. The cutting blade 51 cultivates relatively close to the plant while the cutting blade 52 is cultivating at a greater distance from the plant. In order to accomplish this action the bevel gear 49 had to be added in order to move the driven pinion 50, shaft 47 and blades 52 a greater distance from the center line of the unit than the shaft 46 and associate blades 51.

Referring to Figure 5, it will be noted that the blades 51 and 52 travel in a direction so as to pass one another directly over the plant or on the horizontal plane. In order to do this the idler gear 48A had to be interposed between the driving bevel gear 39 and the bevel gear 48, best illustrated in Figure 7.

It will be noted that when the pruning blades are facing one another or in their horizontal plane, that they will trim the stalks off the plants. When the blades rotate away from the said horizontal plane they assume an angle from the horizontal towards the vertical at which point they will prune the suckers and cultivate around the plant. The direction of rotation of the head 41 of the unit is in an opposite direction to the rotation of the pruning and cultivating blades 51 and 52, thereby performing a more complete cultivating job.

From the above description it can be readily understood how the pruning and cultivating units are positioned over the plants, and by simply pressing downward on them they prune the top of the plant, prune the suckers, and at the same time mulch the ground around the plant. This is a very speedy and efficient operation. After each plant has been cultivated the tractor is moved forward, together with the pruning implement until the next plants have been reached, at which time the operator centers the unit A thereover, lowering the same into operating position.

Although certain specific embodiments of the invention have been shown and described, it is obvious that many modifications thereof are possible. The invention, therefore, is not to be restricted except in so far as is necessitated by the prior art and by the spirit of the appended claims.

What I claim is:

1. A pruning and cultivating implement comprising a casing; a main shaft in the casing, spaced apart blade carrying shafts mounted in the casing and depending therefrom at an angle to the main shaft, and a substantially U-shaped blade mounted on the end of each depending shaft with each portion of the blade at an angle to the center line of the shaft, whereby the portions of the blades will alternately sweep over a plant under the main shaft and sever the sprouts on said plant above ground when said blades are in one position in their rotation and angularly cut into and cultivate the soil and cut the sprouts on the plant underground when the blades are in another position in their rotation, and means between the main shaft and angular shaft for rotating the blades.

2. A pruning and cultivating implement as defined in claim 1, wherein means are provided for rotating the casing in a circular path while the blades are rotating in their circular paths.

3. A pruning and cultivating implement comprising a casing, a main shaft in the casing, a head on the end of the casing, a pair of angularly disposed shafts depending from the head, said shafts mounted different distances from the center of the head, a substantially U-shaped blade mounted on each depending shaft, means for rotating each shaft and its blade, in an independent circular path, and means for simultaneously bodily revolving the shafts and their blades in a circular path so that the said blades will alternately sweep over a plant and sever the sprouts on said plant above ground and cut the sprouts on the plant underground.

4. A pruning and cultivating implement comprising a casing, a drive shaft in the casing, a head at the lower end of the drive shaft, a pair of angularly disposed shafts mounted in and depending from the head, the lower end of each angularly disposed shaft having a substantially U-shaped blade, the distance between the shafts and their angular disposition and the angle of the opposite end portions of the blades permitting the opposite end portions of the pairs of blades in one portion of their rotation to lie in horizontal overlapping relation to each other to sever the sprouts on a plant above ground and in another position of their rotation to cut into and cultivate the soil about the plant, and means to operate the angular shafts from the drive shaft.

5. A pruning and cultivating implement as defined in claim 4, wherein the blades rotate in independent circular paths, and means to rotate the head and angularly disposed shafts in a path independent of the circular paths of the blades.

WILLARD A. SLOPER.

REFERENCES CITED

The following references are of record in the file of this patent:

UNITED STATES PATENTS

| Number | Name | Date |
| --- | --- | --- |
| 1,198,589 | Shellaberger | Sept. 19, 1916 |
| 1,506,042 | Bauer | Aug. 26, 1924 |
| 1,584,962 | Schmutte | May 18, 1926 |
| 1,620,510 | Beise et al. | Mar. 8, 1927 |

FOREIGN PATENTS

| Number | Country | Date |
| --- | --- | --- |
| 338,258 | Germany | June 14, 1921 |